United States Patent
Miyauchi et al.

(10) Patent No.: US 6,278,680 B1
(45) Date of Patent: Aug. 21, 2001

(54) INITIAL CRYSTALLIZATION METHOD OF RECORDING MEDIA AND DEVICE THEREOF

(75) Inventors: Yasushi Miyauchi, Akishima; Eiji Sahota, Odawara; Shin Matsumoto, Nakai-machi; Kazuhiro Soga, Odawara; Motoyasu Terao, Hinode-machi, all of (JP)

(73) Assignee: Hitachi Computer Peripherals Co., Ltd. (JP)

( * ) Notice: Subject to any disclaimer, the term of this patent is extended or adjusted under 35 U.S.C. 154(b) by 0 days.

(21) Appl. No.: 09/275,424

(22) Filed: Mar. 24, 1999

(30) Foreign Application Priority Data

Mar. 25, 1999 (JP) .................................................. 10-076955

(51) Int. Cl.$^7$ ........................................................ G11B 7/12
(52) U.S. Cl. .................................. 369/112.01; 369/44.37; 369/44.23
(58) Field of Search ............................... 369/44.23, 44.27, 369/44.12, 44.28, 44.22, 44.37, 44.38, 44.74, 112.01, 112.03

(56) References Cited

U.S. PATENT DOCUMENTS

| | | | |
|---|---|---|---|
| 4,656,618 | * | 4/1987 | Kaku et al. .................... 369/112.05 |
| 5,317,555 | * | 5/1994 | Takahashi et al. .................... 369/110 |
| 5,671,207 | * | 9/1997 | Park .............................. 369/44.37 X |

FOREIGN PATENT DOCUMENTS

| | | |
|---|---|---|
| 62-271234 | 11/1987 | (JP) . |
| 4-186530 | 7/1992 | (JP) . |
| 10-112065 | 4/1998 | (JP) . |

* cited by examiner

Primary Examiner—Muhammad Edun
(74) Attorney, Agent, or Firm—Nixon Peabody LLP; Jeffrey L. Costellia

(57) ABSTRACT

An initial crystallization method of a recording medium such as a phase-change optical disk, which comprises forming a light spot composed of at least two flat elliptical beam spots each having a long axis direction and a short axis direction and irradiating a rotating recording medium with the light spot such that the long axis direction of the beam spots becomes other direction than the parallel direction to the track direction of the recording medium, wherein the above-described light spot has at least two peaks of light intensity in the short axis direction and the interval of said two peaks of light intensity is 10 $\mu$m or smaller but not smaller than 2 $\mu$m, and a device for carrying out the initial crystallization method.

By the initial crystallization method and the device thereof, the initial crystallization of the recording film of the recording medium can be surely carried out at a high speed without causing non-uniformity.

12 Claims, 2 Drawing Sheets

INITIAL CRYSTALLIZATION METHOD OF RECORDING MEDIA AND DEVICE THEREOF

FIELD OF THE INVENTION

The present invention relates to an initial crystallization method of a recording medium recording an information with a recording beam (light energy beam) such as a laser light, etc., and a device thereof, and in particular, to an initial crystallization method of a recording medium such as a phase-change optical disk recording an information by the phase change between a crystalline state and an amorphous state with a recording beam such as a laser light, etc., and a device for the initial crystallization.

BACKGROUND OF THE INVENTION

In phase-change optical disks by conventional techniques, an information is written by irradiating a recording beam such as a laser light, etc., and erasing of the information is carried out by applying an overwrite by irradiating an erasing beam (erasing optical spot) such as a laser light, etc., onto the information-written portions.

An initial crystallization device for the phase-change optical disk carrying out a high-speed erase of an information performs an overwrite that by changing the power of one laser beam between two levels higher than a reading power level (the two levels are called an intermediate powder level and a high power level), while erasing the already written information, a new information is recorded.

In the phase-change optical disk, at least a part thereof is in a non-crystalline state or in a quasi-stable crystalline state direct after producing (called as-deposited state) the recording film by a vapor-deposition method or a sputtering method. In the phase-change optical disk in the as-deposited state, auto-focusing and tracking (i.e., a function of positioning a beam onto a recording track) are usually liable to become unstable owing to the low reflectivity thereof.

Accordingly, in the phase-change optical disk, an initial crystallization of previously crystallizing the whole surface of the above-described recording film is generally carried out.

In the known first initial crystallization method by a conventional technique, as described, for example, in JP-A-4-186530, a high-output laser beam of the output of from 1 to 2 W is formed into a flat elliptical light spot, a recording medium is irradiated with the light spot such that the lengthwise direction of the light spot coincides with the radius direction of the recording medium, and the initial crystallization is carried out by heating the crystal film of the recording medium with the light spot to a temperature range of from the crystallization temperature of the film to the melting point thereof.

Because in the conventional first initial crystallization method, to surely initially crystallize the crystal film of a recording medium, it is necessary the sending speed of the light spot is delayed and a same place of the crystal film is irradiated with the light spot several times, there are a disadvantage that a time of 1 minute or more is required for the initial recrystallization of the recording medium and a disadvantage that a non-uniformity of reflectivity occurs on the recording track by the non-uniformity of overlapping of the light spot and a jitter of a reproduced wave-form signal occurs.

Also, in a known second initial crystallization method by other conventional technique, as described in JP-A-62-271234, a light spot for the initial crystallization is divided into a welding spot for heating the crystal film of a recording medium and slow-cooling light spots for removing heat. Also, in the initial crystallization method, the above-described slow-cooling spots are in the form of two partially overlapped flat elliptical spots which are arranged in such a manner that the lengthwise directions of the flat elliptical spots coincide with the track direction of the recording medium, and the initial crystallization is carried out by the welding spot and the slow-cooling spots described above.

However, because in the conventional second initial crystallization method, flat elliptical slow-cooling spots extending to the track direction of the recording medium are used, there is a disadvantage that only one track can be initially crystallized by one rotation of a recording medium and a time of 1 minute or more is required for the initial crystallization of the whole surface of a recording medium.

Also, the present inventors previously filed Japanese Patent Application No. 8-262757 (Application date: Oct. 3, 1996) [JP-A-10-112065, Laid-open date: Apr. 28, 1998], in which, as a third initial crystallization method, a technique of carrying out the initial crystallization by flat elliptical light spots for initial crystallization formed by arranging laser beams of a small diameter from plural light sources in a partially overlapped state in the direction (the radius direction of an optical disk) rectangular to the track of the optical disk was proposed.

However, because in the third initial crystallization method, the flat elliptical light spots for initial crystallization formed by arranging laser beams of a small diameter from plural light sources in the direction rectangular to the track of an optical disk are used and the optical spots are moved to the radius direction of the optical disk per definite pitch, there is a disadvantage that a non-uniformity occurs in the reflectivity on the recording track by the non-uniformity by overlapping of the light spots, whereby a jitter of the reproduced wave-form signal occurs.

In addition, the conventional techniques on the second and third initial crystallization methods described above were indicated by the official actions when the present inventors previously filed other inventions regarding initial crystallization device to the Japanese Patent Office. The inventions filed by the present inventors are Patent Application No. 10-72367 wherein two circular light spots are almost overlapped with each other to unify the power distribution of the laser beams and Patent Application No. 10-93410 in which in addition to a circular light spot for initial crystallization, a circular light spot of focusing is employed. The explanations of these inventions are omitted because they have no direct relation with the content of the present invention.

SUMMARY OF THE INVENTION

The present invention has been made for solving the above-described disadvantages of the initial crystallization methods and device of optical disks by the conventional techniques. Furthermore, an object of this invention is to provide an initial crystallization method and device of an optical disk capable of surely initial-crystallizing the crystal film of a recording medium at a high speed without giving non-uniformity.

By the initial crystallization method and the initial crystallization device of the present invention for attaining the above-described object, the crystal film of a recording medium can be surely initial-crystallized at a high speed without giving non-uniformity by forming a light spot composed of at least two flat elliptical beam spots each having a long axis direction and a short axis direction, irradiating the rotating medium with the light spot such that the above-described long axis direction becomes other direction than the parallel direction to the track direction of the recording medium, wherein said beam spots each has at least two peaks of light intensity in the short axis direction, and the interval between said two peaks of light intensity is 10 μm or smaller but not smaller than 2 μm.

Also, in the present invention, the above-described light spot has a 1st beam spot first irradiating the rotating recording medium and a 2nd beam spot irradiating the rotating recording medium subsequent to the irradiation by the above-described 1st beam spot, and the light intensity of the 1st beam spot is higher than the light intensity of the 2nd beam spot.

Furthermore, in the present invention, the ratio of the light intensities of the above-described two beam spots of the light spot are changed, or the linear velocity of the track of the above-described recording medium is made constant, or the rotation speed of the recording medium is made constant.

DETAILED DESCRIPTION OF THE INVENTION

Then, the initial crystallization method and the initial crystallization device of recording media according to the present invention are explained in detail by referring to the accompanying drawings.

Figure 1:
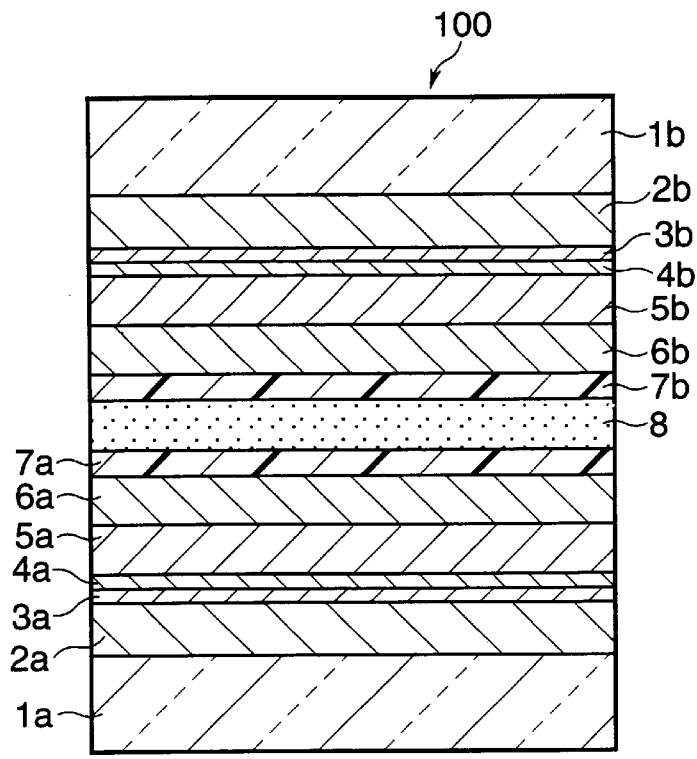
FIG. 1 is an enlarged view for explaining the sectional structure of a phase-change optical disk to which the present invention is applied.

FIG. 1 is an enlarged view showing the sectional structure of a phase-change optical disk (recording medium) to which the present invention is applied. The phase-change optical disk is a rewriting type and is prepared by laminating a recording film, etc., on each of circular polycarbonate substrates 1a and 1b of 120 mm in thickness and adhering the two circular substrates 1a and 1b each having the recording film, etc., laminated thereon such that the recording film of each substrate is placed in the inside portion between the two substrates.

On the surfaces of each of the substrates 1a and 1b of the above-described optical disk 100 are concentric-circularly formed many U-form guide grooves of a depth of 0.6 mm. The guide grooves are formed at an interval of 1.48 μm and the interval becomes the track pitch.

In the production process of the optical disk, first, on the above-described polycarbonate substrate 1a is formed a ZnS—SiO protective film 2a having a thickness of about 100 nm by a magnet sputtering method, on the protective film 2a is formed a recording film 3a having a composition of $Ge_2Sb_2Te_5$ at a film thickness of 20 nm, furthermore, on the recording film 3a is formed an intermediate film 4a having a composition of ZnS—SiO at a thickness of 20 nm, and further, on the intermediate film 4a is formed an Si layer (also, called a 1st reflection layer) 5a having a thickness of 80 nm and an Al—Ti layer (also, called 2nd reflection layer) 6a having a thickness of 100 nm. The formation of these layers is successively carried out in a same sputtering device. Then, in the process, a ultraviolet-curing resin 7a is coated on the Al—Ti layer 6a.

Then, in the production process, as in the above-described process, on the above-described polycarbonate substrate 1b is formed a ZnS—SiO protective film 2b having a thickness of about 100 nm by a magnet sputtering method, on the protective film 2b is formed a recording film 3b having a composition of $Ge_2Sb_2Te_5$ at a film thickness of 20 nm, furthermore, on the recording film 3b is formed an intermediate film 4b having a composition of ZnS—SiO at a thickness of 20 nm, and further, on the intermediate film 4b is formed an Si layer (also, called a 1st reflection layer) 5b having a thickness of 80 nm and an Al—Ti layer (also, called 2nd reflection layer) 6b having a thickness of 100 nm. The formation of these layers is successively carried out in a same sputtering device. Then, in the process, a ultraviolet-curing resin 7b is coated on the Al—Ti layer 6b.

Then, in the production process, by sticking the substrate 1a and the substrate 1b prepared in the above-described two processes with a two-parts-mixing room-temperature hardening-type adhesive 8 such that the recording films 3a and 3b are placed in the inside portion between the two substrates, one sheet of optical disk is produced.

Figure 2:
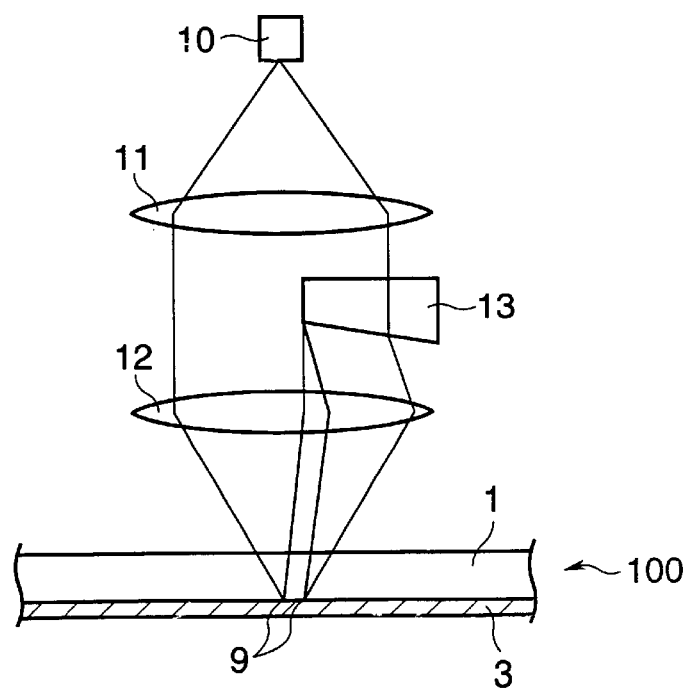
FIG. 2 is a schematic view for explaining the initial crystallization method and the initial crystallization device of recording media according to an embodiment of the present invention.

Then, the initial crystallization method and device of the optical disk prepared in the above production process are explained. FIG. 2 is a schematic view showing a principal construction of an initial crystallization device realizing the initial crystallization method of the present invention.

The initial crystallization device is equipped with a semiconductor laser 10 generating high-output laser beams having a wavelength of 810 nm and the maximum output of 1 W, a collimator lens 11 of focusing laser beams irradiated from the above-described semiconductor laser 10 to form collimated light, a prism 13 of polarizing the incident light of a part of the above-described collimated light, an objective lens 12 of focusing the collimated light passed through the prism 13 and the collimated light directly passed through the collimate lens 11 as light spot 9, and a rotating mechanism of rotating an optical disk. The semiconductor laser 10, the collimator lens 11, the prism 13, the objective lens 12, and the control mechanism and a circuit controlling them described above form a light spot forming means.

In the case of using the initial crystallization device, the optical disk 100 produced in the above-described process is rotated at a linear velocity of 10 meters/second and the recording film 3 of the optical disk 100 is irradiated with he light spot 9 of an irradiation power of 850 mW while carrying out a focus control such that the light spot 9 is focused onto the recording film 3.

Figure 3:
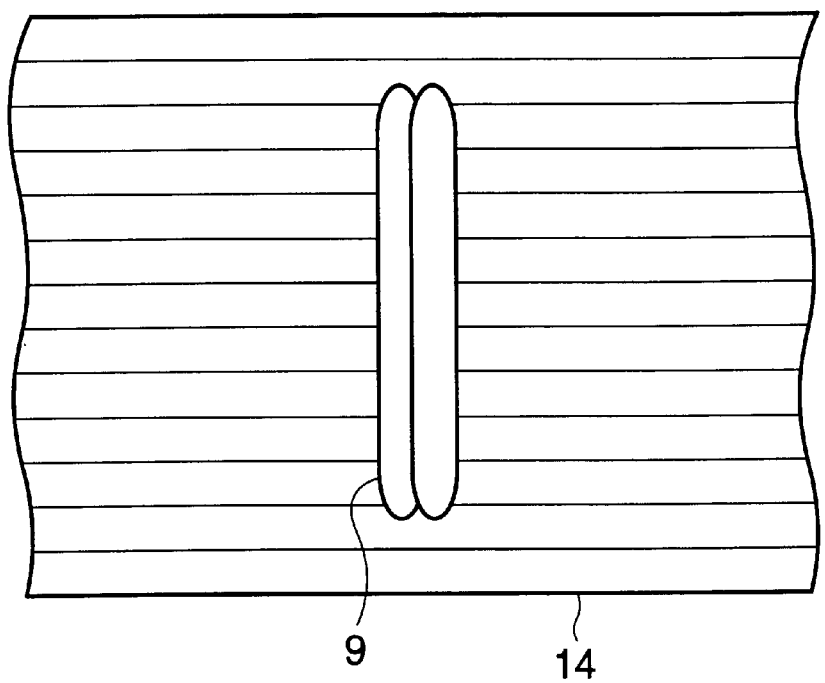
FIG. 3 is a schematic enlarged view for explaining the optical spot for initial crystallization by an embodiment of this invention.

FIG. 3 is an enlarged view for explaining the forms and the direction of the light spot 9.

Figure 4:
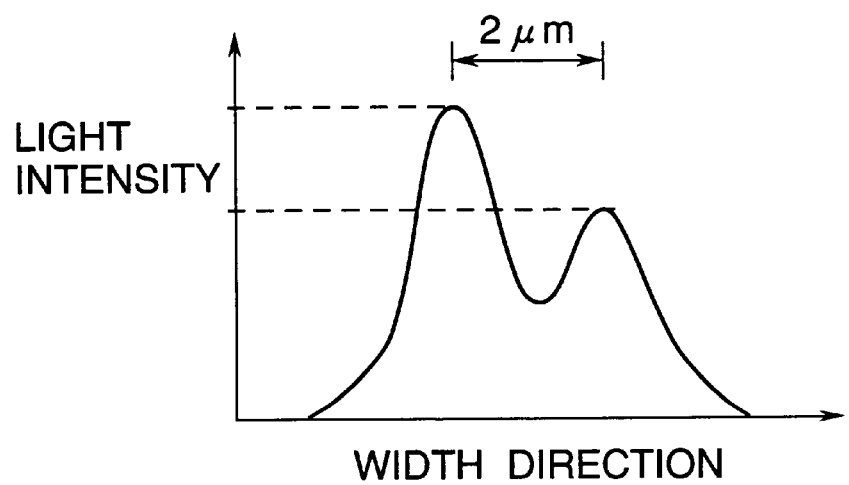
FIG. 4 is a graph showing the intensity distribution of the optical spot for initial crystallization in the width direction (short axis direction) thereof according to an embodiment of this invention.

As shown in FIG. 3, the light spot 9 has the form that flat elliptical beam spots cross the tracks 14 of the recording film 3 at almost a right angle are partially overlapped such that the interval between the peak centers of the light intensity becomes in the range of 10 μm or smaller but 2 μm or larger. In the example, as shown in FIG. 4, the interval between the peak centers of the above-described flat elliptical beam spots is defined to be 2 μm. Also, it is preferred that the ratio of the above-described peak values is about 3:2. Also, the half width of the lengthwise (long axis) direction of the light spot 9 is 50 μm.

The light intensity of the above-described light spot 9 has two peak values in the short axis direction because in the light spot 9, two flat elliptical beam spots are partially overlapped as shown in FIG. 4, and the peak value of the one beam spot is higher than the peak value of another beam spot. The reason that the peak value of one beam spot is higher than that of the another beam spot is because the beam spot of the high peak value initiate first the initial crystallization by the rotation of the optical disk to fast increase the temperature of the recording film 3.

In the above-described embodiment, the example of making the interval between the peak centers of the two beam spots 2 μm was explained but in the practical device, it is preferred that the interval is 10 μm or smaller but not smaller than 2 μm. The reason that the interval is defined to be 2 μm or larger is because if the interval is less than 2 μm, the error rate of the practical reproducing signal (lower than $10^{-4}$) is not obtained.

Also, because a semiconductor laser generating a high-output laser beam having a wavelength of 810 nm and the maximum output of 1 W is used, it is better that the above-described interval is 10 μm or smaller.

In the case of using the initial crystallization device thus constructed, in the state that the optical disk 100 is rotated at a linear velocity of 10 meters/second, the recording film 3 of the optical disk 100 is irradiated with the light spot 9 wherein the above-described flat elliptical beam spots are overlapped, and further the light spot 9 is moved to the radius direction of the optical disk at a definite pitch.

In addition, in the initial crystallization device, for making the above-described linear velocity constant, the rotation speed of the optical disk is changed at the position of the light spot 9 on the optical disk in the radium direction thereof. The speed control is called CLV (Constant Linear Velocity).

The present inventors have obtained the following results by investigating the relation of the sending pitch of the light spot 9 in the radius direction of the optical disk and the initial crystallization state:

| Sending pitch | Initial crystallization state |
| --- | --- |
| 6 μm | Initial crystallization state having many non-uniformities of overlapping |
| 12 μm | Uniform initial crystallization state |
| 24 μm | Uniform initial crystallization state |
| 36 μm | Uniform initial crystallization state |
| 42 μm | Initial crystallization having a large non-uniformity by insufficient initial crystallization |

Accordingly, the inventors have confirmed that by rotating the optical disk 100 at a linear velocity of 10 meters/second, irradiating the recording film 3 of the optical disk 100 with the light spot 9, and further moving the light spot 9 to the radius direction of the optical disk at a pitch of from 12 μm to 36 μm, the uniform initial crystallization of the recording film can be carried out over the whole surface of the optical disk. The best sending pitch is 24 μm.

To shorten the time for the initial crystallization, a method of increasing the linear velocity to the track is considered. Because in the method, by increasing the linear velocity to the track, the energy per unit time can be increased, the sending speed of the light spot 9 to the radius direction per one rotation can be increased as compared with the above-described linear velocity of 10 meters/second and the initial crystallization time of the whole surface of the optical disk can be shortened. As the result of investigating the rotation speed of the optical disk, the inventors have confirmed that when the linear velocity V [meters/second] is in the range of $5 \leq V \leq 15$, a sure initial crystallization having less non-uniformity of reflectivity of the recording film can be carried out.

In the above-described embodiment, the example that the lengthwise direction (long axis direction) of the light spot 9 crosses to the direction of the track 14 at a right angle was explained but in the present invention, the angle of the lengthwise direction (long axis direction) of the optical spot 9 and the direction of the track 14 is not limited to 90 degrees. For example, the angle may be in the range of from 30 degrees to 150 degrees. That is, by defining the angle of the light spot 9 to the track 14 to the range of from 30 degrees to 150 degrees, the irradiation power onto the recording film per unit area can be increased as the case of limiting the angle to 90 degrees only and although the intensity of the laser beam irradiated from a semiconductor laser has non-uniformity in the lengthwise direction of the light spot, but by irradiating the same place of the recording film with a different portion in the lengthwise direction of the light spot, that is, by irradiating with the light spot while inclining the direction of the beam spots, the recording film can be uniformly initial-crystallized.

Also, in the above-described embodiment, the example of forming one light spot 9 by arranging two flat elliptical beam spots was explained but the present invention is not limited to the example. For example, in this invention, the light spot may be formed by arranging three or more flat elliptical beam spots. Even in such a light spot, it is preferred that the peak power value of the flat elliptical beam spot first irradiating onto the recording film is larger than the peak power values of other flat elliptical beam spots. The reason is because by increasing the peak power of the beam spot first initiating the initial crystallization by the rotation of the optical disk, the temperature of the recording film 3 is fast raised.

Furthermore, in the above-described embodiment, the example of carrying out the rotation control of the optical disk by the CLV system but the invention is not limited to the example, and the invention can be also applied to an initial crystallization device of carrying out the rotation control of the optical disk by a CAV (Constant Angle Velocity) of keeping the rotation of the optical disk at constant. In the case of using the initial crystallization device of the CAV system, when the light spot irradiating position is at the external circumference of the optical disk, it is considered that the beam power of the light spot is increased as compared with the beam power to the internal circumference, the angle of the lengthwise direction of the light spot to the direction of the track is reduced lower than 90 degrees, and the sending pitch of the light spot is reduced as compared with that of the internal circumference.

The initial crystallization device for realizing the initial crystallization method by the above-described embodiment is equipped with a semiconductor laser of a high output, a light spot-forming means of forming a light spot by arranging two or more flat elliptical beam spots in the direction crossing the direction of the track at almost a right angle by focusing the beam irradiated from the semiconductor laser onto the recording film, a rotating means of rotating the optical disk, and a sending means of sending the light spot to the radius direction of the optical disk, wherein the above-described light spot-forming means forms two flat elliptical beam spots and a peak of a high light intensity in each spot, the interval between the peaks is defined to be 3 $\mu$m or smaller, and further, the light intensity of the peak of the flat elliptical beam spot first irradiating onto the recording film is defined to be higher than the light intensity of the peak of other beam spot.

In the light spot-forming means, the ratio of the light intensity of the peak of the former beam spot to the light intensity of the peak of the another beam spot can be changed and further, the above-described interval between the above-described peaks can be also changed.

As described above, in the initial crystallization method and the initial crystallization device of recording media, by forming a light spot composed of at least two flat elliptical beam spots having a long axis direction (lengthwise direction) and a short axis direction, irradiating a rotating recording medium with the light spot such that the lengthwise direction (long axis direction) becomes other direction than the parallel direction to the track direction of the recording medium, wherein the above-described light spot has at least two peaks of a light intensity in the short axis direction, and the interval between the above-described two peaks of the light intensity is defined to be 10 $\mu$m or smaller but not smaller than 2 $\mu$m, the crystal film of a recording medium can be surely initial-crystallized at a high speed without giving non-uniformity.

What is claimed is:

1. An initial crystallization method of a recording medium by initial-crystallizing a recording medium recording an information by the irradiation of an energy beam, comprising a first step of rotating the recording medium, a second step of forming a light spot composed of at least two flat elliptical beam spots each having a long axis direction and a short axis direction, wherein the light spot has at least two peaks of light intensity in the short axis direction and the interval between said two peaks of light intensity is 10 $\mu$m or smaller but not smaller than 2 $\mu$m, and a third step of irradiating the rotating recording medium with the light spot such that the long axis direction (lengthwise) of the light spot is other direction than the parallel direction to the track direction of the recording medium.

2. An initial crystallization method of a recording medium of claim 1 wherein the light spot of the second step is composed of a 1st beam spot of first irradiating the rotating recording medium and a 2nd beam spot of irradiating the rotating recording medium subsequent to the irradiation with the 1st beam spot.

3. An initial crystallization method of a recording medium of claim 1 or 2 wherein in the 1st step, the linear velocity of the track of the recording medium is constant and in the 2nd step, the ratio of the light intensities of two beam spots of the light spot are changed.

4. An initial crystallization method of a recording medium of claim 3 wherein in the 2nd step, the light intensity of the beam spot irradiating before the recording medium is higher than the light intensity of the beam spot irradiating subsequently the recording medium.

5. An initial crystallization method of a recording medium of claim 1 or 2 wherein in the 1st step, the rotation speed of the recording medium is constant and in the 2nd step, the ratio of the light intensities of two beam spots of the light spot are changed.

6. An initial crystallization method of a recording medium of claim 5 wherein in the 2nd step, the light intensity of the beam spot irradiating before the recording medium is higher than the light intensity of the beam spot irradiating subsequently the recording medium.

7. An initial crystallization device of initial-crystallizing a recording medium recording an information by the irradiation of a laser beam, comprising a rotating means of rotating the recording medium and a light spot-forming means of forming a light spot composed of at least two flat elliptical beam spots each having a long axis direction and a short axis direction and irradiating the rotating recording medium with the light spot such that the long axis direction becomes other direction than the parallel direction to the track direction of the recording medium, wherein the light spot formed by the light spot-forming means has at least two peaks of light intensity in the short axis direction, and the interval between the two peaks of light intensity is 10 $\mu$m or smaller but not smaller than 2 $\mu$m.

8. An initial crystallization device of initial-crystallizing a recording medium of claim 7 wherein the above-described light spot-forming means forms a first beam spot first irradiating a rotating recording medium and a second beam spot irradiating the rotating recording medium subsequent to the irradiation by the 1st beam spot.

9. An initial crystallization device of initial-crystallizing a recording medium of claim 8 wherein the above-described rotating means makes the linear velocity of the track of the recording medium constant and the above-described light spot-forming means changes the ratio of the light intensities of the two beam spots of the above-described light spot.

10. An initial crystallization device of initial-crystallizing a recording medium of claim 9 wherein the above-described light spot-making means makes the light intensity of the beam spot irradiating before the recording medium higher than the light intensity of the beam spot irradiating subsequently the recording medium.

11. An initial crystallization device of initial-crystallizing a recording medium of claim 7 wherein the above-described rotating means makes the linear velocity of the track of the recording medium constant and the above-described light spot-forming means changes the ratio of the light intensities of the two beam spots of the above-described light spots.

12. An initial crystallization device of initial-crystallizing a recording medium of claim 11 wherein the above-described light spot-making means makes the light intensity of the beam spot irradiating before the recording medium higher than the light intensity of the beam spot irradiating subsequently the recording medium.

* * * * *